Feb. 1, 1955 V. J. TERRY 2,701,277

ELECTRONIC TELEGRAPH RELAY CIRCUITS

Filed Sept. 26, 1951 4 Sheets-Sheet 1

Inventor

V. J. TERRY

By Robert Harding Jr.
Attorney

Feb. 1, 1955 V. J. TERRY 2,701,277

ELECTRONIC TELEGRAPH RELAY CIRCUITS

Filed Sept. 26, 1951 4 Sheets-Sheet 2

*Inventor*
V.J. TERRY
By Robert Harding Jr.
*Attorney*

Feb. 1, 1955 V. J. TERRY 2,701,277

ELECTRONIC TELEGRAPH RELAY CIRCUITS

Filed Sept. 26, 1951 4 Sheets-Sheet 3

Inventor
V. J. TERRY
By Robert Harding Jr.
Attorney

Feb. 1, 1955 V. J. TERRY 2,701,277

ELECTRONIC TELEGRAPH RELAY CIRCUITS

Filed Sept. 26, 1951 4 Sheets-Sheet 4

Inventor

V. J. TERRY

By Robert Harding Jr.
Attorney

United States Patent Office 2,701,277

Patented Feb. 1, 1955

2,701,277

ELECTRONIC TELEGRAPH RELAY CIRCUITS

Victor John Terry, London, England, assignor to International Standard Electric Corporation, New York, N. Y., a corporation of Delaware Application September 26, 1951, Serial No. 248,299

Claims priority, application Great Britain October 6, 1950

8 Claims. (Cl. 178—69)

This invention is concerned with the substitution of electronic tubes for telegraph relays and has particular relation to difficulties which arise with single current working although it also has application to double-current working.

When the tongue of a telegraph relay moves from one contact to the other, current to or from the telegraph line can flow through it, the value of the current only being limited by protecting resistances or similar means.

A telegraph line or cable is in fact an elongated condenser and therefore currents greatly in excess of those necessary to operate the receiving relay flow through the sending relay contacts when these are first closed, since in addition to the necessary currents for operating the distant relay, current has to be supplied to charge the line. Similarly, when the sending relay contacts are reversed the current to be passed must be sufficient to discharge the line as well as to operate the receiving relay. The currents which flow during the discharge of the line are frequently referred to as relaxing currents. The conventional electro-mechanical telegraph relay is well able to meet these requirements since the current which passes through its contacts is only limited by the cross-section of the areas in contact and the connecting leads and it is therefore able to pass the required transient currents of high value which occur at the changes of signal condition. Electro-mechanical relays have however, the disadvantage that there is a time lag in their operation owing to the inertia of the moving parts which results in distortion of the signals and sets a limit to practical transmission speeds.

Numerous devices are known for regenerating distorted signals at an intermediate point in the telegraph line so that they are retransmitted from the intermediate point substantially in the same form as they were originally transmitted, but with a slight time delay. In order to avoid the distortion due to mechanical inertia in the relays, however, it has been sought to replace the electro-mechanical relays by electronic devices which can perform the functions of mechanical relays at very much higher speeds since the inertia of moving mechanical parts is not involved. A disadvantage of the use of electronic means, e. g. vacuum or gas-filled tubes, is that the current which they can pass is limited so that they are not readily adapted to deal with the large transient charging and relaxing currents caused by the capacity of the telegraph line.

The object of the present invention is to provide electronic means to control telegraph currents delivered to a line or instrument in such a manner that the voltage produced across the line or instrument may closely approximate that which would be produced were a telegraph relay, having its marking and spacing contacts connected to appropriate marking and spacing potentials (through normal protective resistances), to be substituted for the electronic means.

Another object of the invention is to make provision for the large transient currents, which may flow into or out of the line when changes from mark to space (and vice versa) occur, without drawing from thermionic valves (which are used in the invention) currents, much, if any, in excess of the steady state currents.

These objects are accomplished in accordance with the present invention by including the primary winding of a transformer in the input circuit to the telegraph line and applying the transient currents induced into its secondary winding to augment the initial flow of current into the line. A second secondary winding can be arranged to provide a path for the relaxing currents and rectifying devices such as dry rectifiers, non-linear resistances or vacuum or gas-filled tubes, are preferably introduced into the secondary winding circuits poled so as to favour the desired transient currents and block the undesired ones at any given moment.

The invention therefore provides a circuit arrangement for transmitting telegraph signals over a telegraph line having distributed impedance, comprising an electric discharge device, the output of which is connected to said line and controlled by the source of said telegraph signals, characterised by the provision of means for producing transient induced currents at each change in the applied signals and applying them to said line in such manner as to correct the distortion produced by the distributed impedance.

The invention further provides a circuit arrangement for transmitting double-current telegraph signals over a telegraph line having distributed impedance, comprising two electric discharge devices with their outputs connected to impress opposite potentials on said line, the discharge of the two devices being controlled in accordance with said telegraph signals, characterised by means for producing at each change of the applied signals transient induced currents of such nature as to correct the distortion of the signal produced by said distributed impedance.

The invention will be better understood from the following description taken in conjunction with the accompanying drawings in which.

Figure 1:
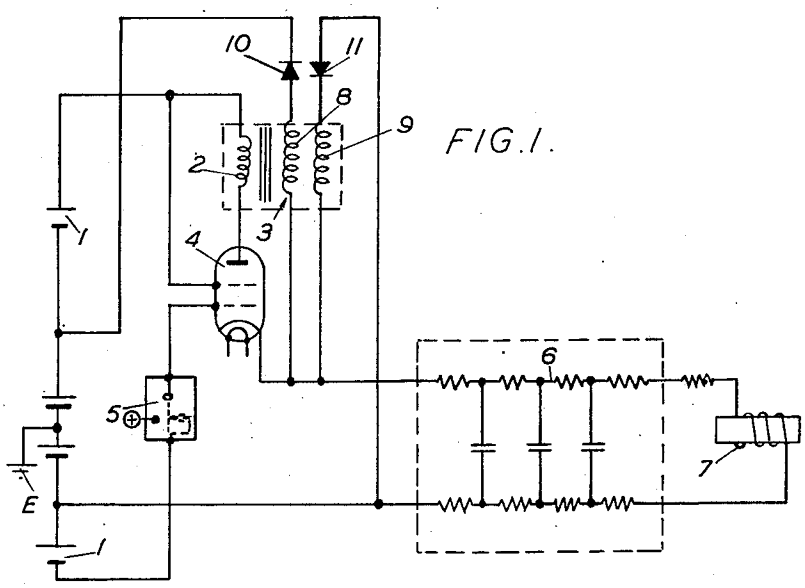
Fig. 1 shows a circuit representing a simple embodiment of the invention for single current working using a single transmitting electronic tube connected as a cathode-follower.

The first case to be considered will be the single current transmitter. In this, a source of signals which may be a manually operated key or the transmitting contact of an automatic transmitter, would normally be operated to the closed condition to send a "mark" and to the open position to send a "space." The source of signals may in itself be electronic. Current would be sent to line for the mark condition, and no current would be passing during the space condition. Hitherto the source of signals has commonly operated a transmitting relay directly connected to the line. This relay can however, be replaced by an electronic discharge device such as a thermionic tube, the operation of the source of signals serving to initiate the discharge of such device, the output of which is connected to the line so that current passes to line when mark condition is required and the current is suppressed when space condition is required. It can be seen that it is necessary for the line to be charged at least partially before sufficient potential difference is built up at the receiving end to operate a receiving instrument. Furthermore, when the electronic discharge current is suppressed there is no path at the sending end for the relaxation current from the line such as would normally be provided by the back contact of a sending relay. This difficulty is obviated by providing a transformer with its primary winding connected in the output circuit of the discharge device and a secondary winding connected through a rectifier to a battery and to the line in such a way that current flows through the secondary into the line during the build up time of the transformer, thus providing the extra charging current required at the commencement of the marking condition.

A second secondary winding is connected between the line and earth, there being a rectifier in series with the winding and this secondary forms a shunt discharging the line when the discharge device is suppressed. In a simple embodiment of the invention the signal input into the outgoing line is obtained from the cathode of a thermionic tube which therefore acts as a cathode follower. It is usually preferable to use more negative feedback than is inherent in the cathode follower as will be explained later and an auxiliary amplifying tube is therefore introduced into the circuit so connected as to provide voltage feedback. The output of the amplifying tube is applied to the grid of the output tube. It is also to be noted that although a transformer with two secondary windings is referred to above, it is a simple matter to connect the two rectifiers to one secondary winding so as to produce the same effect as was obtained with the two windings.

In a further variation of the circuit the outgoing line is connected to the anode of the transmitting tube and the feedback is into the cathode of the auxiliary amplifying tube.

The two rectifiers used in these circuits may be replaced by two three-electrode gas filled tubes with suitable biassing potentials applied to their trigger electrodes, or they can be replaced by a single four-electrode gas filled tube with suitable biassing potential applied to the two trigger electrodes.

The same principle can be applied to double current working though the advantages obtained are less striking since two transmitting tubes are required, one for marking and one for spacing so that the problem of discharging the line does not arise so acutely. The advantage of passing into the line more current during the transient stage is however still obtained.

Figure 1 deals with a simple form of single current circuit and is given for explanation.

In the figure there is a source of direct current 1, here represented as a battery, the positive end of which is connected through the primary winding 2 of a transformer 3 to the anode of a transmitting tube 4. The negative end of the battery 1 is normally connected to the control grid of tube 4 through a transmitting device 5 which applies the signalling potential to the control grid as required. This device can take many forms in practice but can be regarded for the purposes of this description as a make and break device such as a manually operated key or the contact of an automatic sending machine. This will be referred to hereafter as the key. Normally, in single current working, current is sent to line to indicate marking condition and suppressed to indicate spacing condition. When the key indicated in the signalling device 5 is closed a positive potential from the signalling device is applied to the control grid of the transmitting tube 4 and current then passes from the battery (Figure 1) through winding 2 to the anode of tube 4. The potential applied to the control grid of tube 4 is not directly derived from the battery 1 but from a connection forming part of the signalling device 5 and not shown in detail. At the distant end, the line is terminated by some form of telegraph receiver represented by a receiving electro-magnet 7. The current returns over the return path to a suitable point on the battery 1. The battery is earthed at a suitable point E.

When, after a long period in the no-current condition, the key is operated to apply a positive voltage to the control grid of valve 4, current commences to flow from the cathode and to build up through the primary winding 2 of the transformer 3, inducing electro-motive forces in the secondaries 8 and 9. The increase of current renders the top end of winding 2 and the lower ends of windings 8 and 9 positive. Accordingly, current commences to flow through rectifier 11 to provide part of the line current, and continues, so long as the induced voltage exceeds the voltage applied to the line. Initially, if the ratio of the transformer is unity, the induced current is equal to the primary current, and a transient current (almost equal to twice the steady state current), may flow without the valve 4 needing to provide a current in excess of the steady state value. Afterwards, the induced current decays, but will not cease entirely until the overshoot has subsided if the inductance of the transformer is sufficiently large.

When the telegraph signal from key 5 reverts to the "no current" condition, the sense of the induced potential in windings 8 and 9 reverses, draining current from the line through rectifier 10. The induced current is initially equal but opposite in sense to the reduction of the cathode current below its steady state ("current condition") value, but the induced current falls to zero as soon as the cathode current ceases (if it does not do so before). Meanwhile, the rectifier 10 temporarily is able to drain from the line capacity, a current not exceeding the former steady state value; when a transformer of unity ratio is used, the peak of drainage current cannot exceed the steady state ("current condition") current, but with a higher transformation ratio, this restriction is avoided.

The energy returned to the power supply through rectifiers 10 and 11 during transient periods, and the extra energy supplied to the line by current flowing through rectifier 11, is obtained from the anode circuit of the valve 4 and the supply voltage must be high enough for this purpose. For example, if the steady state potential across the line during current period is 160 volts, and the transformer ratio is unity, a supply of about 360 volts is required, giving, during steady state "current" periods, 200 volts between the screen and cathode and the same between anode and cathode. During the transient period, when current is building up, the screen-to-cathode potential is little affected, but the anode-to-cathode potential falls to about 40 volts, which is, however, sufficient for a well-designed tetrode or pentode of a type suitable for this purpose.

The choice of primary inductance in the transformer is not very critical, but should be roughly appropriate to the current values used, the duration of the transients, and of course, to the transformer ratio.

The magnetising current of the transformer, when the full output voltage is applied thereto, should not build up to a value exceeding the steady state current value until the current overswing subsides. Thus, if in the example already quoted, the steady state current is 48 ma. and the transient overswing duration is 12 milliseconds, the transformer inductance should not be less than $160 \times .012/.048 = 40$ henries. It is also preferable that the inductance should not be so great that the induced and rectified currents persist for much more than the unitary telegraph period. If therefore, the telegraph speed in the example quoted were to be 50 bauds, it would not be desirable to use a transformer (of unit ratio) whose inductance were much to exceed $160 \times .020/.048 = 67$ henries.

The choice of transformation ratio is made chiefly by reference to the ratio of the peak transient current to the steady-state current. In the single current circuit, the entire relaxation current must be furnished from the secondary of the transformer. If the peak of this reverse current has a value $n$ times the steady current, then the voltage (step-down) ratio from primary 2 to secondary 8 must be at least $n$, and probably 50% greater. If this ratio is inconveniently large, it is desirable to limit the peak discharge and charge currents by means of series inductance applied to the input of the telegraph line otherwise an excessive anode supply voltage may be needed. It is not essential that the windings 8 and 9 be equal, more particularly because, if winding 9 has too many turns, the maximum of charging current can be supplied by increase of the cathode current above the steady state value, whereas no such corresponding margin is available to provide for excessive relaxation currents if winding 8 has too many turns.

Figure 2:
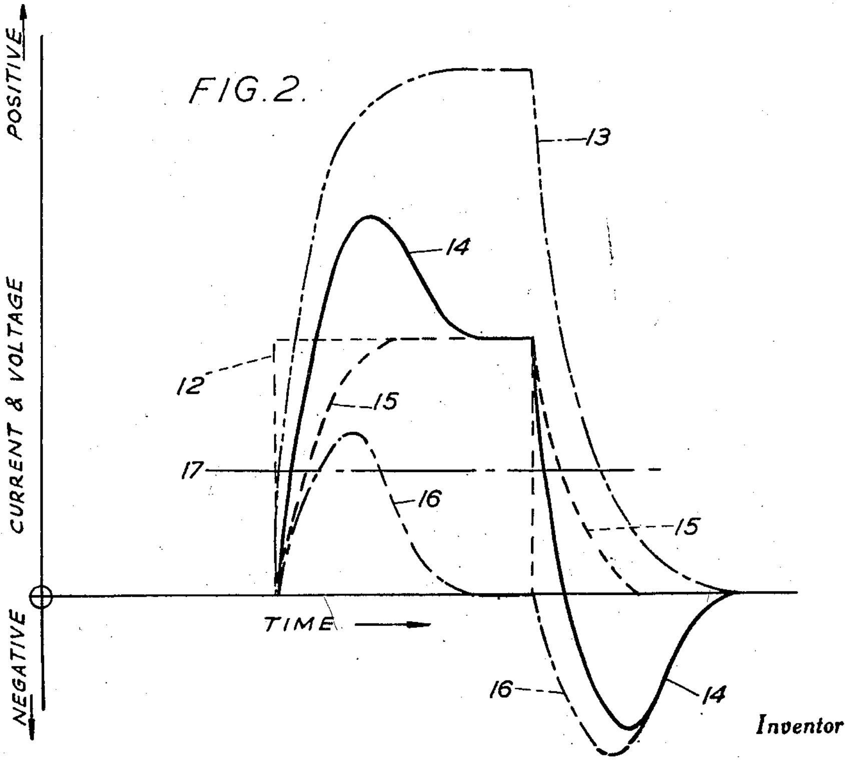
Fig. 2 shows in the form of curves the variation of current value in various parts of the circuits.

In Fig. 2 there are shown a number of curves representing the variation of currents in various parts of the circuit described above.

Curve 12 represents the ideal telegraph signal which it is desired to receive. The maximum ordinate of this curve represents to an appropriate scale the positive voltage applied to the device upon keying.

Curve 13 represents the voltage which is, in practice, applied to the input of the line.

Curve 14 represents the total current in the line when the voltage varies according to graph 13.

Curve 15 represents the cathode current in output valve 4 (Fig. 1).

Curve 16 represents the contribution of rectifiers 10 and 11 (Fig. 1) to the total current (curve 14).

Curve 17 represents half the current amplitude of the ideal signal and by reason of the scales chosen it also represents half the current amplitude of the steady state output current.

Figure 3:
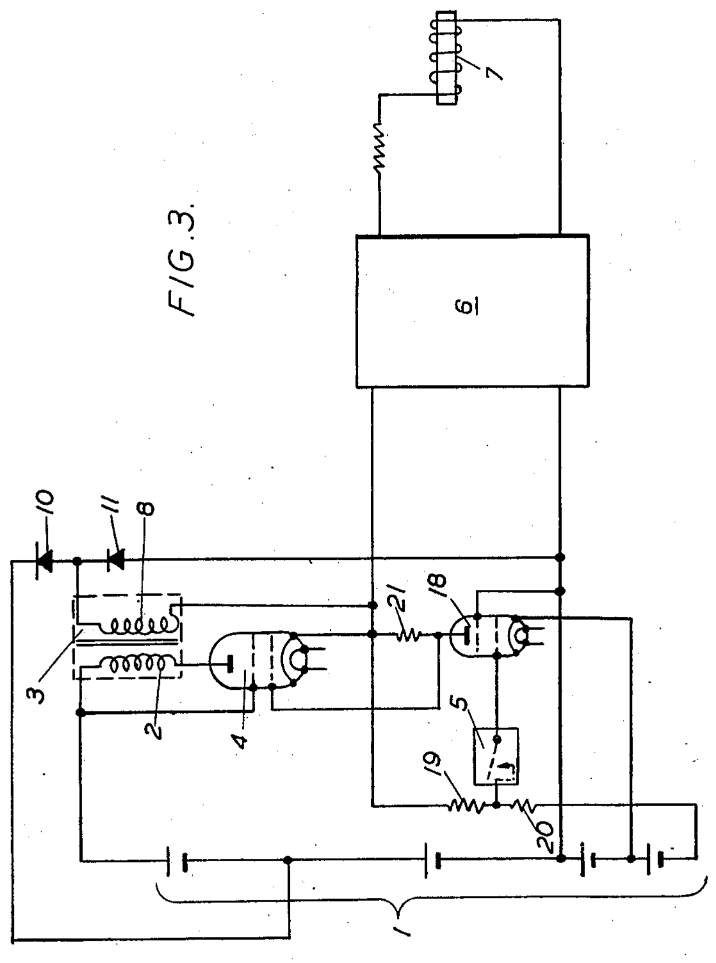
Fig. 3 shows some modifications of the circuit of Fig. 1 introducing additional negative feedback.
Figure 4:
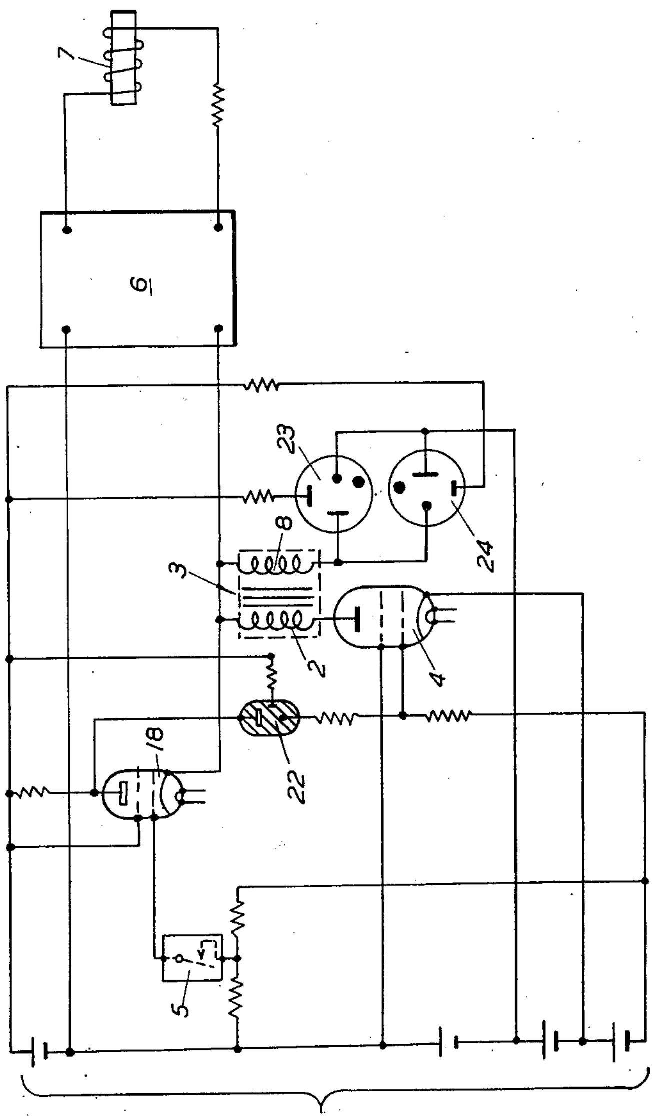
Fig. 4 shows a modified circuit according to the invention in which the anode of the transmitting tube is connected to the load and employing negative feedback.

In the circuit of Fig. 1, since windings 8 and 9 are in the same sense, they may be combined into one single winding as in Figures 3 and 4 if they are of equal ratio, or they may be combined into one tapped winding if their ratios differ. Separate windings are shown in Fig. 1 for ease of description.

It has been stated that it is an object of the invention to provide an electronic control circuit approximating to that which would be produced were a telegraph relay having its marking and spacing contacts connected to appropriate sources of potential (through normal protective resistances), to be substituted for the electronic means.

If, in the circuit of Fig. 1, transformer 3 and rectifiers 10 and 11 are omitted, and the valve 4 is connected as a triode, in the "current condition" the effective impedance connecting the upper wire of the telegraph line (as shown) to the power supply is that of the cathode of a cathode follower, namely a fairly low resistance. As such, it simulates the impedance of the marking contact and of a protective resistance which would be used if an ordinary telegraph relay were to be substituted. In the "no current," or spacing condition, the triode is cut off (or nearly so) and presents a high impedance.

The circuit would thus show approximately the output impedance properties of a telegraph relay having its marking contact connected and its spacing contact disconnected, i. e. a telegraph relay arranged for commutation by interruption. To secure, in accordance with the invention, the properties of a telegraph relay having both marking and spacing potentials (for single current the appropriate spacing potential is zero) it is necessary that the effective impedance of the output of the circuit of Fig. 1 should be moderately low at all times when current is liable to flow, i. e. throughout the marking period and during the earlier part of each spacing period. When the signal current has entirely ceased, the impedance is no longer significant and may without objection be infinite (unless induced interference currents are present). Reference to curve 15 of Fig. 2 will show that in the earlier portion of each spacing period, current is flowing through the cathode of valve 4 when the complete circuit of Fig. 1 is used and that accordingly the cathode impedance of the valve is reasonably low during this period. Moreover the currents induced in the transformer add to the changes of current produced by changes of cathode potential and effectively reduce the cathode impedance.

The efficacy of the circuit of Fig. 1 depends on the mutual conductance of valve 4, and since, when the anode current is nearly cut off, the mutual conductance is substantially reduced, it is preferable to use more negative feedback than is inherent in the cathode follower in order to reduce the dissymmetry between the current and no-current conditions. Fig. 3 shows the addition of an amplifying valve 18 with voltage feedback from the output through resistances 19 and 20. The output of valve 18 appears across the anode resistance 21 and is applied to the grid of valve 4.

The small anode current taken by valve 18 assists to discharge the line during spacing periods.

Fig. 4 is a further variant, in which the output circuit is connected to the anode instead of the cathode of valve 4.

In this case feedback is into the cathode of valve 18 and a gas tube 22 in series with two resistances **22*a*, 22*b* has been included in the circuit to act as a voltage stabilizer and thereby provide grid potential for the tube 4. The substitution of further gas discharge tubes for the rectifiers 10 and 11** (Figs. 1 and 3) will be explained later.

Reference was made earlier to the fact that the output impedance of the circuit of Fig. 1 should not be infinite at any time if interfering currents are induced during the spacing period. When such is the case, and it is desired to eliminate their effect from receiver 7 by permitting an equal induction in both conductors of the line, a small current drain must be drawn through valve 4 at all times, such, for example, as is taken by valve 18 of Fig. 3 or by a resistance similarly connected.

In Figs. 1, 3 and 4, it is not essential that the rectifiers should be connected to points whose potential exactly matches the marking and spacing potentials, for example, in Fig. 3 it is quite permissible to connect rectifier 10 to a point on the supply 1 more positive than the nominal output voltage in the "current" condition and rectifier 11 may be connected to a tap on supply 1 more negative than the return side of the line 6. A larger induced voltage will then be necessary in the secondary winding 8 of transformer 3 before the induced current can flow and therefore a slightly greater grid voltage must be applied to the valve 4. Further, a somewhat higher anode voltage is needful and the magnetising current of transformer 3 is increased unless its inductance is increased. None of these disadvantages is, however, serious.

In Fig. 4, rectifiers 10 and 11 (of Fig. 1) are replaced by gas discharge tubes 23, 24 whose maintaining voltages (in the working direction) slightly exceed half the output voltage of the circuit in the "current" condition. Trigger electrodes permanently primed from higher potentials assist the firing of these tubes, each of which supplants a rectifier and the biassing potential applied thereto.

Though less efficient, it is also possible to use, in place of the rectifiers or gas tubes, a non-linear conductor, of the kind in which the current-voltage characteristic is such that the current varies in proportion to the cube or even the fifth power of the voltage. With such material, a certain leakage current flows continually, thus adding to the load.

Figure 5:
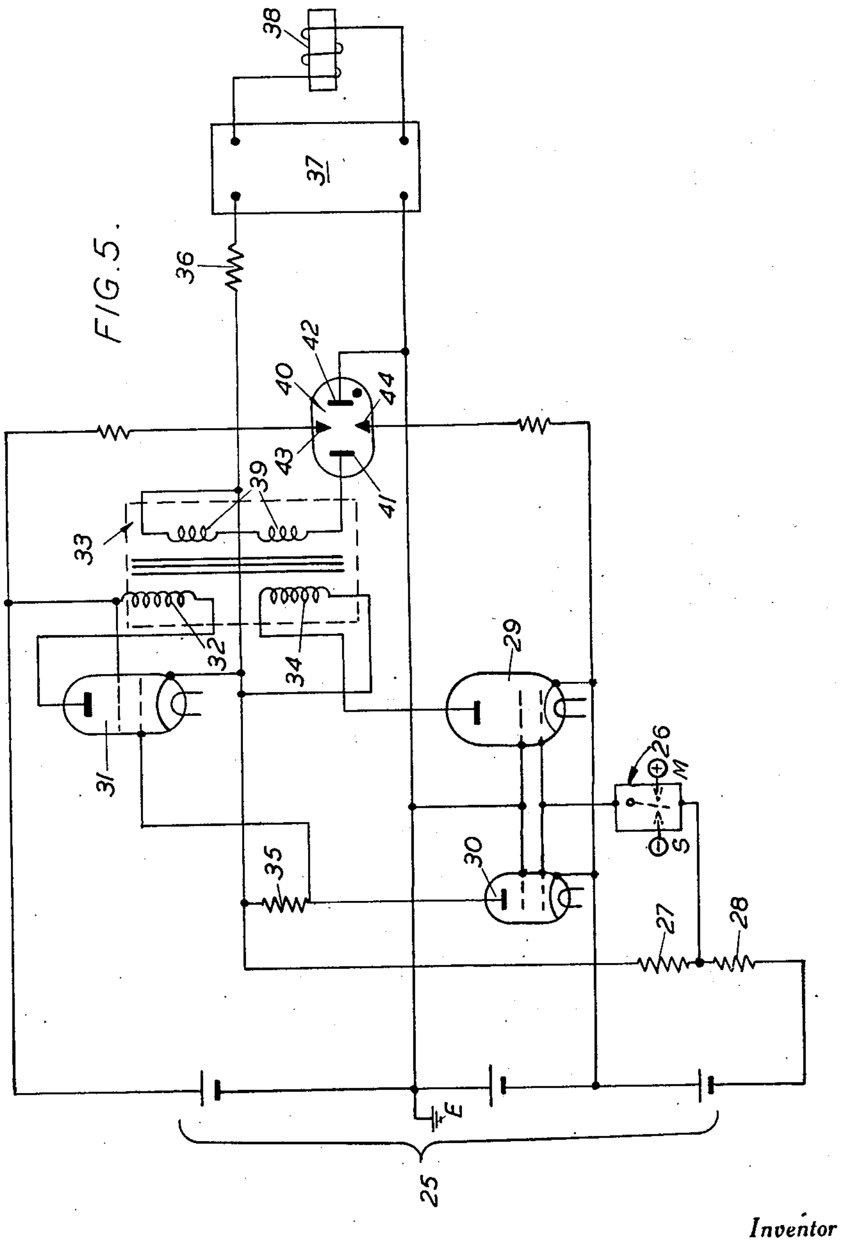
Fig. 5 shows a circuit embodying the invention connected for double-current working.

In Fig. 5 there is shown a circuit for adapting the invention for double current working. It will be seen that this is largely a combination of Figs. 3 and 4. In this figure, the source of direct current is tapped source 25 indicated conventionally as a battery, and the source of signalling potential which will now have to be equivalent to a reversing key is shown as transmitting device 26. As explained above this device can take many forms but for the purposes of this description it can be looked upon as a manually or automatically controlled key which sends forward positive or negative potentials in accordance with the telegraph signals it is desired to transmit.

The positive and negative potentials are not derived from the battery 25 but from connections forming part of the transmitting device 26. Resistances 27 and 28 provide appropriate biassing potential for the control grids of tubes 29 and 30 and for dividing the potential into two parts for the feedback paths through tubes 29 and 30. The screens of tubes 29 and 30 are shown connected to earth. Tubes 29 and 31 are the main tubes which supply respectively the steady components of the marking and spacing currents. It is to be noticed that the anode of tube 31 is connected through part of the primary winding 32 of transformer 33 to the positive end of battery 25 while the anode of tube 29 is connected through the other part 34 of transformer 33, and the high resistances 27 and 28 to the negative end of the battery 25. Tube 30 is a reversing tube the purpose of which will be explained shortly, and its anode is also connected to the negative end of the battery 25 through a resistance 35 and the high resistances 27, 28.

With regard to tubes 29 and 30 it is to be noted however that the anodes are also connected through the stabilising resistance 36 inserted before the line 37, through the line and the receiving instrument 38 and back to the earthed point E on the battery 25. As resistances 27 and 28 are only concerned with the provision of a grid biassing potential they are very large and the anodes of tubes 29 and 30 will be virtually at earth potential. The cathodes of tubes 29 and 30 are connected to the battery 25 at a point which is negative with respect to the anodes.

Normally when the circuit is in operation, either tube 31 or tube 29 will be conducting, tube 29 being the marking tube. When a positive potential is sent from the transmitting device 26 to the control grids of each of the tubes 29 and 30 thus overcoming the original negative bias, these tubes become conducting and the anode current taken by the tube 29 will pass through winding 34 of the transformer 33, through resistance 36, line 37, receiver 38 and to the battery 25 at its earthed point E. Thus the receiving device 38 will be operated to its mark condition. The fact that tube 30 has been rendered conducting provides a current path through resistances 35 and 36, line 37, receiver 38 to the earth point of the battery. The consequent fall of potential over resistance 35 will make the control grid of tube 31 negative with respect to its cathode and tube 31 will not be conducting. If now a negative potential is applied to the control grids of tubes 29 and 30, anode-cathode conduction across these tubes will be suppressed and the tube 31 will be rendered conducting because there will no longer be a potential drop across resistance 35 so that the cathode and control grid of tube 31 will be at the same potential. When tube 31 becomes conducting, current flows from its cathode through resistance 36 the line 37, receiving instrument 38 and back to the earth point E on the battery 25 and the receiving instrument 38 will be operated to its space condition.

The function of the transformer 33 is similar to that described in the previous embodiments. At the initiation of either space or mark condition by current passing through the primary windings 32 or 34 of the transformer 33, a transient is sent from the secondary winding 39 to reinforce the steady current supplied through the primary windings. The gas filled tube 40 is a reversible tube comprising two main electrodes 41 and 42 and two trigger electrodes 43 and 44. Trigger electrode 43 has a high positive priming potential on it while trigger electrode 44 has a high negative priming potential on it. Whenever the potential of main electrode 41 is sufficiently raised or lowered one of the trigger to main gaps will commence to discharge and the discharge will spread between the two main electrodes. The two main electrodes are connected across the telegraph circuit and are therefore provided with a potential difference sufficient to sustain the discharge.

Thus when valve 31 becomes conducting, current flows through the primary winding 32 and this induces a transient current in the secondary winding 39 and reduces the potential of main electrode 41 of gas filled tube 40. This causes the gap between trigger electrode 43 and main electrode 41 to commence discharging and this discharge spreads across the main gap between electrodes 41 and 42, the latter being the anode in this case. In addition, therefore, to the steady signalling current from the cathode of tube 31 flowing into the telegraph line 37 through resistance 36 there is also the additional current induced in the secondary winding 39 which is being fed into the telegraph line so as to assist the steady current.

When valve 29 becomes conducting (which extinguishes tube 31), current is drawn from the line 37 through resistance 36, primary winding 34 of transformer 33 to the anode of tube 29. The induced current in secondary winding 39 now makes electrode 41 positive and the gap between trigger 44 and electrode 41 becomes conducting; as before, this spreads to the main gap between electrodes 41 and 42. In this case however, electrode 41 is the anode so the current is fed into the line in the opposite direction from that which obtains when tube 31 is conducting.

Although in this embodiment the rectifier circuits have been combined in the form of the one reversible gas filled tube 40 it is not essential to use this kind of tube.

As in the other embodiments, rectifying devices of other kinds or even non-linear resistances may be connected so as to fulfil the same functions as the reversible tube.

While the principles of the invention have been described above in connection with specific embodiments, and particular modifications thereof, it is to be clearly understood that this description is made only by way of example and not as a limitation on the scope of the invention.

What we claim is:

1. A circuit arrangement for transmitting telegraph signals over a telegraph line having distributed impedance, comprising a source of telegraph signals, electron discharge means having an output coupled to said line and adapted to have the conduction thereof controlled by said signals, means for increasing the rate of rise and decay of current flow through said line including means coupled to said discharge means and responsive to the commencement of conduction thereof for producing a first uni-directional current and additional means coupled to said discharge means and responsive to the decrease of conduction thereof for producing a second uni-directional current, means for applying said first current to said line in a direction to add to the output of said discharge means, and means for applying said second current to said line in a direction to increase the rate of reduction of the current flowing through said line.

2. A circuit arrangement according to claim 1 wherein said means for producing said first uni-directional current comprises a transformer the primary winding of which is connected in the output circuit of said electron discharge means and the secondary winding of which is connected on the one side to a point at a potential intermediate that of the terminals of said line and on the other side to one of the terminals of the line, the poling of the secondary winding being such that the transient current induced when said electron discharge means commences to discharge reinforces the current flowing from the discharge device into said telegraph line.

3. A circuit arrangement according to claim 1 wherein said means for increasing the rate of rise and decay of current flow through said line comprises a pair of rectifiers, a transformer having a primary winding and a pair of secondary windings, said primary winding being connected in the output circuit of said discharge means, both said secondary windings poled in the same sense and connected across the terminals of the telegraph line and through which relaxing current from the telegraph line passes on the cessation of the current flowing into the line from said discharge means, said rectifiers being connected in series with the respective secondary windings and so poled as to favour the desired currents.

4. A circuit arrangement according to claim 1 wherein said means for increasing the rate of rise and decay of current flow through said line comprises a pair of rectifiers, a transformer the primary winding of which is connected to the output of said electron discharge means and the secondary winding of which is connected across the terminals of said telegraph line through a first of said rectifiers poled to favour the flow of currents induced in said secondary winding when said electron discharge means is made conducting and through a second of said rectifiers poled to favour the flow of relaxing currents from the line and connected between one terminal of said telegraph line and a point intermediate in potential of the two terminals of said line.

5. A circuit arrangement according to claim 1, wherein said source comprises means to transmit signals of the double current type, and wherein said discharge means comprises a pair of electron discharge devices, means coupling the outputs of said devices to said line to impress opposite potentials thereon, a first of said discharge devices adapted to be rendered conducting in accordance with a signal of a first current type and the other of said discharge devices adapted to be rendered conducting in accordance with a signal of another current type.

6. A circuit arrangement according to claim 5 wherein said coupling means comprises a transformer having two primary windings one connected in the output circuit of each of said discharge devices and a secondary winding connected between the two terminals of said telegraph line the connections of the two primary windings being so poled that the current induced when either discharge device commences to discharge reinforces the current passing from said discharge device into the telegraph line.

7. A circuit arrangement according to claim 6 further comprising rectifier means included in the circuit of the secondary winding of said transformer said rectifier means being so connected that transient currents induced in said secondary winding only flow into the telegraph line in such manner as to reinforce the current which is being passed into the line from one of the discharge devices.

8. A circuit arrangement according to claim 7 in which said rectifier means comprises a single gas filled tube having four electrodes namely two main electrodes, connected respectively to the telegraph line terminals and two trigger electrodes having respectively positive and negative priming potentials permanently impressed on them, so that when the potential on one of the main electrodes is raised or lowered discharge will be set up across the gap between one of the main electrodes and one of the trigger electrodes and will then spread across the main gap the direction of the discharge across the main gap depending on which terminal of the telegraph line is at the higher positive potential.

References Cited in the file of this patent

UNITED STATES PATENTS 1,593,640 Trueblood ______________ July 27, 1926

FOREIGN PATENTS 972,214 France ______________ Aug. 23, 1950